United States Patent Office.

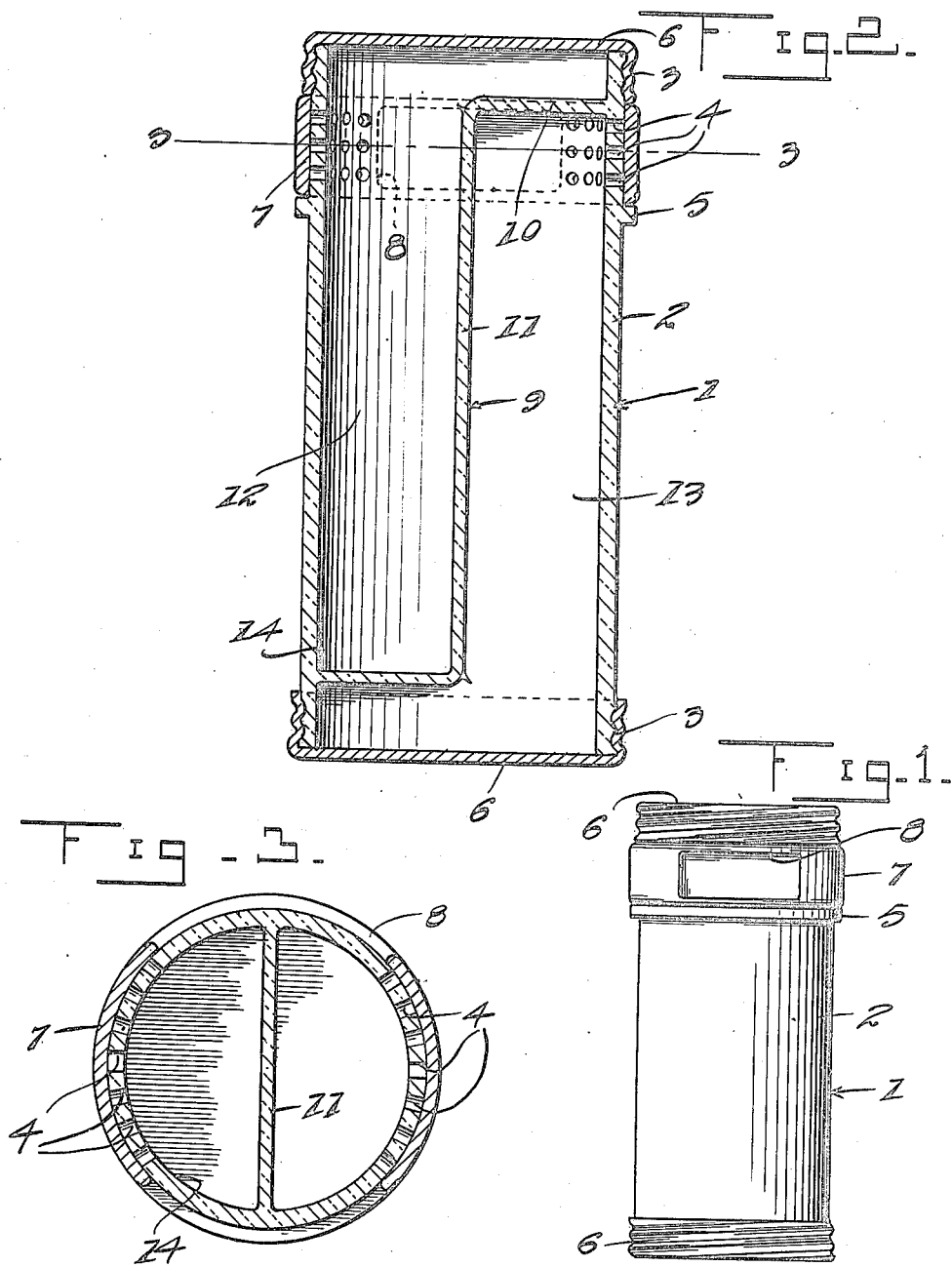

JOSEPH GROSSMAN, OF NEW YORK, N. Y.

COMBINED SALT AND PEPPER SHAKER.

1,215,018.  Specification of Letters Patent.  Patented Feb. 6, 1917.

Application filed June 25, 1915. Serial No. 36,255.

*To all whom it may concern:*

Be it known that I, JOSEPH GROSSMAN, a citizen of the United States, residing at New York, in the county of New York and State of New York, have invented certain new and useful Improvements in Combined Salt and Pepper Shakers; and I do hereby declare the following to be a full, clear, and exact description of the invention, such as will enable others skilled in the art to which it appertains to make and use the same.

This invention relates to new and useful improvements in combined salt and pepper shakers and has for its principal object to provide a device to contain both salt and pepper and deliver the same individually or mixed when so desired.

Another object of the invention is to provide a novel means for controlling the flow of the salt or pepper at the desire of the user.

With these and other objects in view, the invention consists in the novel combination and arrangement of parts which will be fully set forth in the following specification and accompanying drawings, in which, Figure 1 is a view in elevation of a salt and pepper shaker constructed in accordance with this invention, Fig. 2 is a longitudinal sectional view thereof, and Fig. 3 is a transverse sectional view taken on line 3—3 of Fig. 2.

Referring now to the drawings by characters of reference, the numeral 1 designates as an entirety the body portion of the salt shaker which comprises a cylinder 2 provided at its end with the screw threads 3. This cylinder is also provided near one end with a plurality of apertures 4 which are arranged to permit the salt and pepper to flow outwardly when so desired. An annular rib 5 is formed exteriorly of the cylinder 2 at a point adjacent the apertures 4. A suitable screw cap 6 is arranged to be secured to each end of the cylinder and a ring 7 is rotatable between the inner edge of one of the screw caps and the annular flange 5 as clearly shown in Fig. 2. This ring 7 is provided with the outlet openings 8 which are arranged to coöperate with the apertures 4 in permitting the contents of the salt shaker to flow outwardly. A suitable partition designated generally by the numeral 9 is provided and comprises the horizontal walls 10 which are semi-circular in plan and are connected at their flat edges by means of a vertical wall 11 which separates the salt shaker into two separate compartments 12 and 13. The curved edges of these walls are fused or otherwise joined to the walls 2 as at 14 and it will thus be seen that compartments are formed for the reception of the salt and pepper which is to be used in the device.

It will be apparent from the foregoing that the device is filled by removing the screw caps 6 and after the same have been replaced the user may by setting the ring 7 so that the apertures 8 register with the apertures 4, remove the contents from the device and distribute it at the desired point. In this way it will be seen that a particularly simple and effective device is provided which will enable the user to use salt or pepper or salt and pepper combined when so desired.

While in the foregoing there has been shown and described the preferred embodiment of this invention, it is to be understood that such changes may be made in the combination and arrangement of parts as will fall within the spirit and scope of the invention as defined in the appended claims.

What is claimed is:—

1. A combination salt and pepper shaker including a cylindrical body having both ends open, a vertical partition wall arranged centrally within the body and terminating adjacent the opposite open ends thereof, horizontal branch walls secured to the upper and lower ends of the vertical partition wall and directed therefrom in opposite directions and connected to the walls of the cylindrical body forming compartments, said compartments extending longitudinally of the body, said cylindrical body being provided with a plurality of apertures near its upper end, screw caps arranged to form closures for the body, an annular rim formed adjacent the apertures, and a ring rotatable exteriorly of the cylindrical body upon said rim and arranged to close or open the apertures and thereby control the flow of material from the chambers of the body through the apertures.

2. A salt and pepper shaker including a cylindrical body open at both ends, screw caps on the ends of the body forming closures therefor, the body being provided with a plurality of apertures adjacent one end at diametrically opposite points, a vertical partition wall arranged centrally within and connected to the inner face of the walls of the cylindrical body, said vertical partition wall terminating short of the upper and lower ends of the cylindrical body, horizontal branch walls connected to the upper and lower ends of the vertical partition wall and directed in opposite directions therefrom and connected to the cylindrical body dividing the same into separate compartments, one compartment being arranged to receive salt and the other compartment being arranged to receive pepper, an annular rim formed exteriorly around the cylindrical body adjacent its upper end and located beneath the apertures, and a ring rotatable exteriorly of the body and upon said rim for closing said apertures, said ring being provided with apertures to register with the apertures in the opposite side walls of the body and permit the contents of the body to pass therefrom.

In testimony whereof I affix my signature in presence of two witnesses.

JOSEPH GROSSMAN.

Witnesses:
F. W. SEYBOLT,
ELIAS A. HORODAS.